United States Patent
Adachi

(10) Patent No.: US 10,798,305 B2
(45) Date of Patent: Oct. 6, 2020

(54) CONTROL APPARATUS, IMAGING SYSTEM, CONTROL METHOD, AND RECORDING MEDIUM

(71) Applicant: CANON KABUSHIKI KAISHA, Tokyo (JP)

(72) Inventor: Takashi Adachi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 703 days.

(21) Appl. No.: 14/567,882

(22) Filed: Dec. 11, 2014

(65) Prior Publication Data
US 2015/0172554 A1    Jun. 18, 2015

(30) Foreign Application Priority Data
Dec. 18, 2013   (JP) .................. 2013-261495

(51) Int. Cl.
*H04N 5/232* (2006.01)
*G06K 9/46* (2006.01)

(52) U.S. Cl.
CPC .......... *H04N 5/23296* (2013.01); *G06K 9/46* (2013.01); *H04N 5/23216* (2013.01); *H04N 5/23238* (2013.01); *G06K 2009/4666* (2013.01)

(58) Field of Classification Search
CPC ........... H04N 5/23238; H04N 5/23293; H04N 5/2258; H04N 5/23212; H04N 5/23245; H04N 5/2625; H04N 5/272; H04N 5/23216; H04N 5/2254; H04N 5/23296; H04N 13/344; H04N 5/2256; H04N 5/247; H04N 7/18; H04N 21/4223; H04N 5/04; H04N 5/2621; H04N 5/2628; H04N 9/3194; H04N 13/128; H04N 13/275; H04N 13/383; H04N 7/181; H04N 5/23222; H04N 5/77;
(Continued)

(56) References Cited

U.S. PATENT DOCUMENTS

| | | | |
|---|---|---|---|
| 7,904,188 B2 * | 3/2011 | Hatano | H04M 1/6066 700/94 |
| 8,810,627 B1 * | 8/2014 | Cho | H04N 5/2258 348/38 |

(Continued)

FOREIGN PATENT DOCUMENTS

| | | |
|---|---|---|
| CN | 1909602 A | 2/2007 |
| CN | 101827211 A | 9/2010 |

(Continued)

*Primary Examiner* — Dave Czekaj
*Assistant Examiner* — Kehinde Abimbola
(74) *Attorney, Agent, or Firm* — Canon U.S.A., Inc., IP Division

(57) ABSTRACT

A control apparatus includes: a display control unit configured to control a display unit to display part or all of an image in a first region on a display screen displayed by the display unit, the image indicating an imaging range which an imaging apparatus can image by changing the imaging range; a change control unit configured to change a position or size of an image to be displayed in the first region by the display control unit, on the image indicating the range which an imaging apparatus can image; and an output unit configured to output an instruction to cause the imaging apparatus to image an imaging range corresponding to a range indicating an image displayed in a second region which is a part of the first region.

14 Claims, 8 Drawing Sheets

(58) Field of Classification Search
CPC ............. H04N 21/21805; H04N 5/232; H04N 21/2187; H04N 5/23203; G03B 35/00
See application file for complete search history.

(56) References Cited

U.S. PATENT DOCUMENTS

| | | | |
|---|---|---|---|
| 9,131,152 B2* | 9/2015 | Arai | H04N 5/23238 |
| 9,304,627 B2* | 4/2016 | Yamaguchi | G06F 3/0321 |
| 9,344,625 B2* | 5/2016 | Arai | H04N 5/23238 |
| 9,501,214 B2* | 11/2016 | Lee | G06F 3/0485 |
| 9,571,732 B2* | 2/2017 | Cho | H04N 5/2258 |
| 2005/0157173 A1 | 7/2005 | Kurebayashi | |
| 2006/0150099 A1 | 7/2006 | Laff | |
| 2006/0238617 A1 | 10/2006 | Tamir | |
| 2007/0030341 A1 | 2/2007 | Morimoto | |
| 2007/0233905 A1* | 10/2007 | Hatano | H04M 1/6066 710/16 |
| 2009/0195652 A1 | 8/2009 | Gal | |
| 2009/0310845 A1* | 12/2009 | Ogawa | A61B 6/14 382/132 |
| 2010/0030079 A1* | 2/2010 | Hamada | A61B 8/14 600/443 |
| 2010/0171863 A1 | 7/2010 | Kim | |
| 2012/0070058 A1* | 3/2012 | Raju | A61N 7/02 382/131 |
| 2012/0098853 A1* | 4/2012 | Kobayashi | G03B 21/006 345/593 |
| 2012/0120188 A1* | 5/2012 | Arai | H04N 5/23238 348/36 |
| 2012/0188413 A1* | 7/2012 | Park | G06F 17/30274 348/240.99 |
| 2013/0016246 A1* | 1/2013 | Hatanaka | G06T 11/00 348/222.1 |
| 2013/0106991 A1 | 5/2013 | Msawa | |
| 2013/0127622 A1 | 5/2013 | Choi | |
| 2013/0155293 A1 | 6/2013 | Lee | |
| 2013/0169674 A1* | 7/2013 | Kim | G06T 3/40 345/629 |
| 2013/0222340 A1* | 8/2013 | Ito | G06F 3/044 345/174 |
| 2013/0321568 A1 | 12/2013 | Suzuki | |
| 2014/0126687 A1* | 5/2014 | Yoshikawa | A61B 6/145 378/16 |
| 2014/0152562 A1* | 6/2014 | Suzuki | G09G 5/005 345/158 |
| 2014/0194164 A1* | 7/2014 | Lee | G06F 3/0485 455/566 |
| 2014/0240263 A1* | 8/2014 | Jung | H04N 21/42224 345/173 |
| 2014/0285617 A1* | 9/2014 | Arai | H04N 5/23238 348/36 |
| 2014/0285618 A1* | 9/2014 | Cho | H04N 5/2258 348/38 |
| 2014/0327732 A1* | 11/2014 | Arai | H04N 5/23238 348/36 |
| 2014/0327734 A1* | 11/2014 | Arai | H04N 5/23238 348/39 |
| 2015/0032457 A1* | 1/2015 | Koo | G06F 3/165 704/275 |
| 2015/0055004 A1* | 2/2015 | Nakamura | G06F 3/0488 348/333.02 |
| 2015/0070328 A1* | 3/2015 | Yamaguchi | G06F 3/0321 345/175 |
| 2015/0235373 A1* | 8/2015 | Kato | A61B 1/00009 348/51 |
| 2016/0234439 A1* | 8/2016 | Arai | H04N 5/23238 |

FOREIGN PATENT DOCUMENTS

| | | |
|---|---|---|
| CN | 101969532 A | 2/2011 |
| CN | 102348061 A | 2/2012 |
| CN | 102457678 A | 5/2012 |
| CN | 102461153 A | 5/2012 |
| CN | 102713812 A | 10/2012 |
| CN | 103425237 A | 12/2013 |
| JP | H09-116790 A | 5/1997 |
| JP | 2007-043505 A | 2/2007 |
| JP | 2013-229672 A | 11/2013 |
| KR | 10-2007-0106209 A | 11/2007 |
| KR | 10-2012-0105201 A | 9/2012 |
| KR | 20120105201 A | 9/2012 |
| RU | 2452033 C2 | 5/2012 |
| RU | 2011144805 A | 5/2013 |
| RU | 2011149201 A | 6/2013 |
| RU | 2532257 C2 | 11/2014 |

* cited by examiner

CONTROL APPARATUS, IMAGING SYSTEM, CONTROL METHOD, AND RECORDING MEDIUM

BACKGROUND

Technical Field

The present invention relates to an imaging apparatus which controls the imaging range of an imaging apparatus.

Description of the Related Art

Conventionally, there has been known a technology to operate an imaging direction or zooming of an imaging apparatus from a client apparatus via a network. There is also known a technology to display, on a client apparatus, a panorama image indicating a range which can be imaged by the imaging apparatus changing the imaging direction or zoom. Japanese Patent Laid-Open No. 2007-43505 discloses a technology where, upon a user specifying a position in a panorama image displayed on the client device, the imaging direction of the imaging apparatus is changed to a direction according to the specified position on the panorama image. Further, Japanese Patent Laid-Open No. 2007-43505 discloses updating the display of the panorama image upon the user specifying a position on the panorama image, so that the center of the panorama image displayed on the client apparatus, and the position on the panorama image where the user has specified, match.

However, there have been cases in the conventional method where it is difficult for the user to specify desired positions in a range which the imaging apparatus is capable of imaging (e.g., a desired position on a panorama image). For example, in a case of displaying a panorama image on a small-sized display of a mobile terminal or the like, there have been cases where it is difficult for the user to specify a desired range on a panorama image, since the displayed panorama image itself is small. There have further been cases where the user cannot change the imaging range of the imaging apparatus to a desired range, since the desired range could not be specified on the panorama image or the like.

SUMMARY

It has been found desirable to facilitate user specification of a desired range within a range which the imaging apparatus is capable of imaging.

A control apparatus includes: a display control unit configured to control a display unit to display part or all of an image in a first region on a display screen displayed by the display unit, the image indicating an imaging range which an imaging apparatus can image by changing the imaging range; a change control unit configured to change a position or size of an image to be displayed in the first region by the display control unit, on the image indicating the range which an imaging apparatus can image; and an output unit configured to output an instruction to cause the imaging apparatus to image an imaging range corresponding to a range indicating an image displayed in a second region which is a part of the first region.

Further features of the present invention will become apparent from the following description of exemplary embodiments with reference to the attached drawings.

DESCRIPTION OF THE EMBODIMENTS

Figure 1:
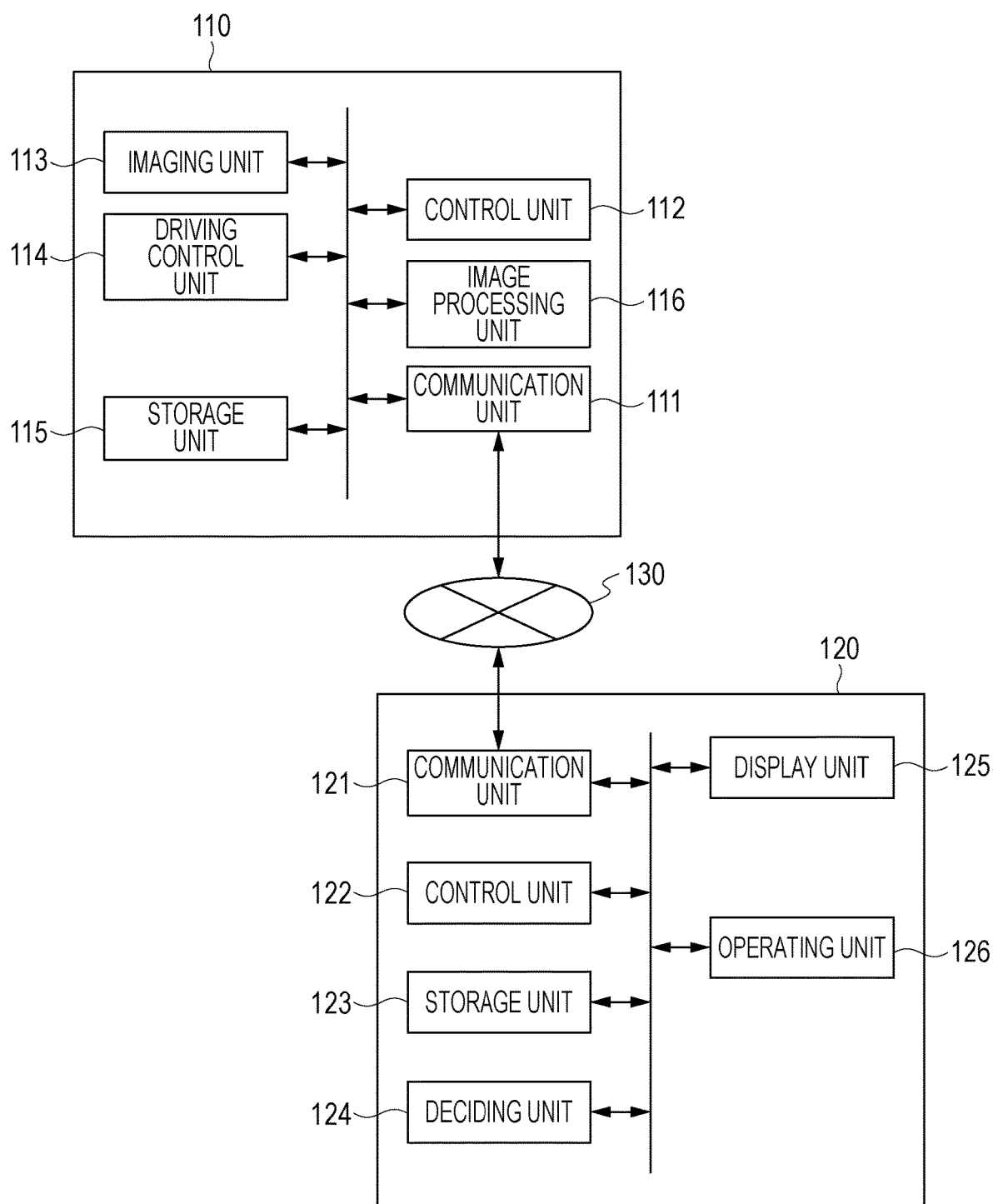
FIG. 1 is a diagram of an imaging system.

Embodiments of the present invention will be described below in detail with reference to the attached drawings.

First Embodiment

An imaging system according to the present invention will be described with reference to FIG. 1. In the imaging system illustrated in FIG. 1, an imaging apparatus 110 and a terminal apparatus 120 are connected via a network 130. Multiple imaging apparatuses 110 may be connected to the network 130.

The imaging apparatus 110 is an imaging apparatus capable of changing imaging range and performing imaging. The imaging apparatus 110 may be a network camera, for example.

The terminal apparatus 120 is a control apparatus which performs control so as to change the imaging range where the imaging apparatus 110 performs imaging. The terminal apparatus 120 may be a personal computer (PC), for example. Alternately, the terminal apparatus 120 may be a mobile terminal, such as a tablet terminal, smartphone, or the like.

Imaged images which the imaging apparatus 110 has imaged are transmitted to the terminal apparatus 120 via the network 130, and displayed on a display unit 125 of the terminal apparatus 120.

The terminal apparatus 120 displays part or all of a panorama image, which is an image indicating a range which the imaging apparatus 110 is capable of imaging by changing the imaging direction and field of image, on the display unit 125.

The terminal apparatus 120 can change, of the range which the imaging apparatus 110 is capable of imaging by changing the imaging direction and field of image, a range corresponding to a first region (region 222 in FIG. 2) on the display screen of the terminal apparatus 120, based on the operations made as to the display screen.

While description will be made in the present embodiment regarding a case where the terminal apparatus 120 has a display unit 125, this is not restrictive. The terminal apparatus 120 may control an external display device connected to the terminal apparatus 120 so as to display the imaged image received from the imaging apparatus 110 on the display device.

The network 130 is configured including, for example, the Internet, a cabled local area network (LAN), a wireless LAN, a wide area network (WAN), or analog cables or the like. There are no restrictions regarding the communication standards, scale factor, and configuration of the network 130. For example, Ethernet (a registered trademark) or the like may be used as a LAN communication standard.

First, the configuration of the imaging apparatus 110 will be described with reference to FIG. 1. An imaging unit 113 images a subject and generates an imaged image. The imaging unit 113 is configured including a lens, an imaging device such as a complementary metal oxide semiconductor (CMOS), and so forth. The imaging device converts an image of the subject formed by the lens into image signals, thus generating an imaged image. The imaging direction of the imaging unit 113 can be changed by control by a later-described driving control unit 114.

An image processing unit 116 performs image processing on the image signals generated by the imaging unit 113. The image processing unit 116 performs encoding of the image which the imaging unit 113 has imaged, for example. Examples of encoding formats include Joint Photography Experts Group (JPEG). Also, H.264/MPEG-4 AVC (hereinafter H.264) may be used as an encoding format. Alternatively, the High Efficiency video Coding (HEVC) encoding format may be used as an encoding format. Encoding formats are not restricted to these. Also, the image processing unit 116 may select an encoding format from multiple encoding formats to perform encoding.

The image processing unit 116 generates a panorama image where an imaged image, that has been imaged in multiple imaging directions by the imaging unit 113, is composited. The image processing unit 116 according to the present embodiment generates a panorama image of a region corresponding to a range where the imaging apparatus 110 can image by changing the imaging direction and zooming. Examples of panorama image encoding formats which can be used include JPEG, Portable Network Graphics (PNG), Graphics Interchange Format (GIF), Bit Map Image (BMP), and so forth. Alternatively encoding formats such as H.264, HEVC, and so forth, can be used as panorama image encoding methods.

While an example of the image processing unit 116 of the imaging apparatus 110 generating a panorama image will be described here, this is not restrictive. The terminal apparatus 120 may generate a panorama image. That is to say, the terminal apparatus 120 may composite multiple imaged images received from the imaging apparatus 110 to generate a panorama image. Alternatively, an unshown server connected to the network 130 may composite multiple imaged images imaged by the imaging apparatus 110 to generate a panorama image. The terminal apparatus 120 may acquire panorama images which the server has generated via the network 130. Which apparatus generates the panorama images is not restricted in particular.

The driving control unit 114 performs control to change the imaging direction and field of view of the imaging unit 113. In the present embodiment, the driving control unit 114 performs control to change the imaging direction of the imaging unit 113 in the panning direction and in the tilting direction. The driving control unit 114 in the present embodiment also changes the field of view of the imaging range of the imaging unit 113 by changing the zooming factor.

While the present embodiment describes a case where the imaging apparatus 110 can change the imaging direction in the panning direction and the tilting direction, and the field of view can be changed, this is not restrictive.

The present invention can also be applied to an imaging apparatus 110 which can image in at least two directions, and does not have functions to change the field of view. Also, the present invention can be applied to an imaging apparatus not having a function to change the imaging direction, but having a function to change the imaging field of view.

While the present embodiment describes a case where the imaging apparatus 110 has the driving control unit 114, this is not restrictive. The imaging direction of the imaging unit 113 may be changed by a pan head attached to the imaging apparatus 110.

A storage unit 115 stores imaged images which the imaging unit 113 has imaged and the image processing unit 116 has subjected to image processing. The storage unit 115 also stores panorama images generated by the image processing unit 116. The storage unit 115 further holds control parameters which a later-described control unit 112 uses.

The imaged images and panorama images may be stored in an external storage unit connected to the imaging apparatus 110. For example, the imaged images and panorama images may be stored in a memory card or the like mounted to the imaging apparatus 110. Alternatively, the imaged images and panorama images may be recorded in an unshown Network Attached Storage (NAS) or the like connected to the network 130.

A communication unit 111 transmits the imaged images imaged by the imaging unit 113 and subjected to image processing at the image processing unit 116, to the terminal apparatus 120. Also, the communication unit 111 transmits the panorama images generated by the image processing unit 116 to the terminal apparatus 120. Further, the communication unit 111 receives control commands for the imaging apparatus 110 from the terminal apparatus 120. Examples of control commands for the imaging apparatus 110 include a command instructing changing of the imaging direction of the imaging unit 113. Examples of control commands for the imaging apparatus 110 also include a command instructing field of view of the imaging unit 113.

The control unit 112 performs control of the components of the imaging apparatus 110 illustrated in FIG. 1. The control unit 112 may be a processor such as a CPU (Central Processing Unit) or the like, for example. In a case where the control unit 112 is configured as a processor, the control unit 112 executes programs stored in the storage unit 115, so as to control the configurations of the imaging apparatus 110.

Next, the configuration of the terminal apparatus 120 will be described with reference to FIG. 1. A communication unit 121 acquires imaged images from the imaging apparatus 110. The communication unit 121 also acquires panorama images. The communication unit 121 further outputs, to the imaging apparatus 110, operation instructions to the imaging apparatus 110. Operation instructions are generated based on input signals which the user has input by operating a later-described operating unit 126 for example, and are transmitted to the imaging apparatus 110.

The communication unit 121 outputs instructions to the imaging apparatus 110, to cause the imaging apparatus 110 to image an imaging range corresponding to a second region (region indicated by a frame 223) which is a part of the first region (display region 222) on the display screen of the terminal apparatus 120.

While description is made in the present embodiment regarding a case of the terminal apparatus 120 acquiring a panorama image, this is not restrictive. An image prepared beforehand, indicating a range where the imaging apparatus 110 can image changing the imaging range may be used instead of a panorama image. For example, instead of a panorama image, a map of a range over which the imaging apparatus 110 can image changing the imaging range may be acquired and used. In the same way as with a panorama image, this image is not restricted regarding from where the image is acquired. This image may be acquired from the imaging apparatus 110, or may be acquired from a storage unit 123 of the terminal apparatus 120. Alternatively, this image may be acquired from an unshown storage device connected to the network 130.

The storage unit 123 holds the imaged images acquired by the communication unit 121. The storage unit 123 also holds panorama images acquired by the communication unit 121.

The display unit 125 displays imaged images and panorama images under control of a later-described control unit 122. The display unit 125 displays the imaged images received from the imaging apparatus 110 on the display region 221 on the display screen of the terminal apparatus 120, which will be described later by way of FIG. 2. The display unit 125 also displays part or all of panorama images in the region 222 (first region) on the display screen. The user can change which range of an entire panorama image to display on the display region 222 by performing operations on the display screen of the terminal apparatus 120.

The display unit 125 further displays the frame 223 superimposed on the panorama images in the present embodiment. The frame 223 is a frame which indicates, out of the range of a displayed panorama image, the region indicating the imaged range to cause the imaging unit 113 of the imaging apparatus 110 to image (second region). The terminal apparatus 120 controls the imaging direction and field of view of the imaged image such that the imaging range of the imaging apparatus 110 is a range corresponding to the region indicated by the frame 223 on the panorama image.

The terminal apparatus 120 according to the present embodiment outputs an instruction to the imaging apparatus 110, to cause the imaging apparatus 110 to image the imaging range corresponding to the partial second region (region indicated by the frame 223) of the first region (display region 222) on the display screen, thus controlling the imaging range of the imaged image.

The display unit 125 displays the frame 223 at a predetermined position on the display region 222. For example, the display unit 125 displays a region which the frame 223 indicates (second region) so as to include the middle of the display region 222 (first region). Alternatively, an arrangement may be made where the user can set the position where the frame 223 is displayed in the display region 222.

The display unit 125 may switch between displaying and not displaying the frame 223 in accordance with user instructions. While the present embodiment is described regarding a case where the display unit 125 displays the frame 223, the frame 223 does not necessarily have to be displayed.

While description is made in the present embodiment that the size of the frame 223 which the display unit 125 displays is constant, the user may be able to change the size of the frame 223 as to the size of the display region 222.

The operating unit 126 accepts user operations as to the display screen of the terminal apparatus 120. For example, the operating unit 126 accepts operations using a touch panel which the terminal apparatus 120 has. The operations which the user performs at the touch panel may include touch operations including tapping, swiping, flicking, pinch-in, pinch-out, and so forth. Alternatively, the operating unit 126 may accept user operations using a mouse, keyboard, or the like, connected to the terminal apparatus 120.

The contents of operations made by the user, and the contents of operation instructions which the terminal apparatus 120 outputs to the imaging apparatus 110 in accordance with user operations, will be described in detail with reference to FIGS. 2 through 5.

A deciding unit 124 decides the contents of operation instructions to transmit to the imaging apparatus 110, in accordance with the contents of operations received at the operating unit 126. For example, the deciding unit 124 decides control values for moving the imaging direction of the imaging apparatus 110 in the panning direction or tilting direction, in accordance with the operation amount as to the operating unit 126. Alternatively, the deciding unit 124 decides control values for enlarging or reducing the field of view of the imaging apparatus 110, in accordance with the operation amount as to the operating unit 126.

The deciding unit 124 may be arranged to decide a changing amount to change the imaging range, in accordance with only one of the distance regarding change in position of the image displayed in the display region 222, and the rate of change of size of the image displayed in the display region 222.

The communication unit 121 outputs an instruction to change the imaging range of the imaging apparatus 110 in accordance with the results decided by the deciding unit 124.

The control unit 122 controls the components of the terminal apparatus 120 illustrated in FIG. 1. For example, the control unit 122 performs display control to control the display unit 125 such that imaged images, part of all of panorama images, and the frame 223 are displayed on the display unit 125.

The control unit 122 may be a processor such as a CPU, for example. In a case where the control unit 122 is configured as a processor, the control unit 122 controls the components of the terminal apparatus 120 by executing programs stored in the storage unit 123, for example.

Next, an example of changing the imaging range of the imaging apparatus 110 by the user operating the terminal apparatus 120 will be described with reference to FIGS. 2 through 5.

Figure 2:
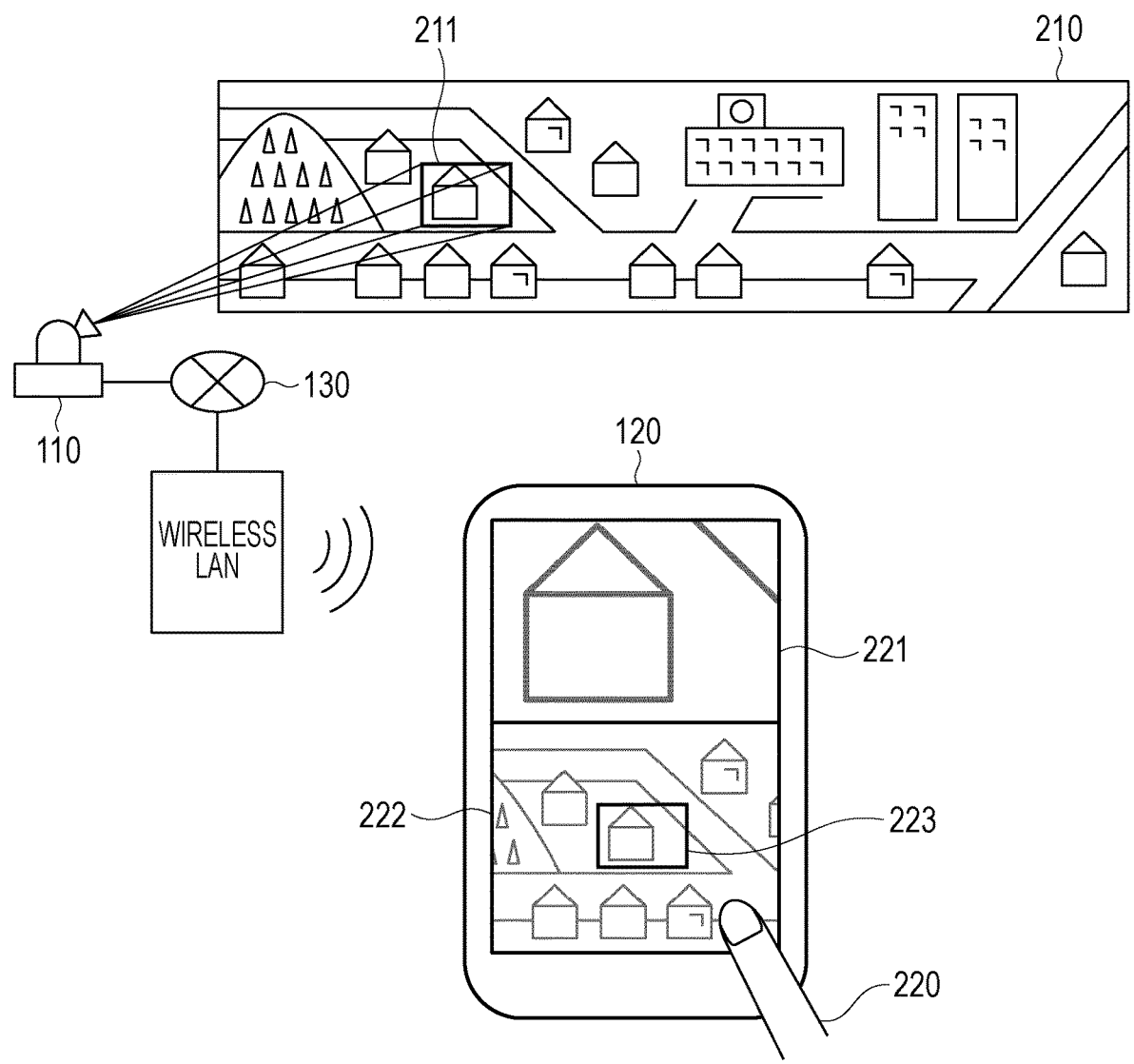
FIG. 2 is a diagram illustrating an operation example for changing the imaging range of an imaging apparatus 110.

In the example illustrated in FIG. 2, the imaging apparatus 110 is a network camera regarding which the imaging direction can be changed in the panning direction and tilting direction. The imaging apparatus 110 has a zoom mechanism and can change the field of view of the imaging range.

In FIG. 2, a range 210 represents a range for imaging, which can be imaged by changing the imaging direction and field of view of the camera. Also, in FIG. 2, frame 211 indicating the imaging range represents the range which the imaging apparatus 110 currently is imaging.

The imaging apparatus 110 composites the multiple imaged images imaged by changing the imaging direction of the imaging unit 113, and generates a panorama image of the range corresponding to the range 210. The generated panorama image is transmitted to the terminal apparatus 120 via the network 130.

While a case will be described regarding the imaging apparatus 110 generating and transmitting the panorama image, an arrangement may be made where the terminal apparatus 120 generates the panorama image using the multiple imaged images which the imaging apparatus 110 has imaged.

Also, the terminal apparatus 120 is a table terminal which controls the panning, tilting, and zooming of the imaging apparatus 110 in the example in FIG. 2. The terminal apparatus 120 performs communication with the imaging apparatus 110 via the network 130. The terminal apparatus 120 communicates with the imaging apparatus 110 via a wireless LAN in the example illustrated in FIG. 2.

The terminal apparatus 120 displays the imaged image which the imaging apparatus 110 has imaged, in the display region 221 on the display screen. The terminal apparatus 120 displays part or all of the acquired panorama image in the display region 222 in the display screen. The display layouts of the display region 221 and display region 222 are not restricted to the example illustrated in FIG. 2, and are optional.

An arrangement may be made where the terminal apparatus 120 displays part or all of a map image indicating the range which can be imaged by changing the imaging range of the imaging apparatus 110 on the display region 222, instead of displaying the panorama image.

Further, the frame 223 is displayed at a predetermined position within the display region 222. The frame 223 indicates the range which is the imaging range of the imaging apparatus 110 in the example in FIG. 2. That is to say, the terminal apparatus 120 displays, in the display region 222 (first display region), an image which includes the imaging range which the imaging apparatus 110 images (the range indicated by the frame 223), and is broader than this imaging range. This display is executed by the control unit 122 controlling the display unit 125.

The user can decide which range of the entire panorama image to be displayed in the display region 222, by operating the terminal apparatus 120. That is to say, the terminal apparatus 120 changes, of the range which the imaging apparatus 110 can image by changing the imaging range (e.g., panorama image), the range to correlate to the first region (display region 222) based on operations accepted from the user. This changing control is performed by the control unit 122 changing the image to display on the display unit 125, based on instructions which the operating unit 126 has accepted.

For example, the user can position a finger 220 on the image displayed in the display region 222 on the display screen, and perform swipe operations in the vertical direction, horizontal direction, or diagonal direction. Thus, out of the regions on the panorama image, the region displayed in the display region 222 can be changed in the vertical direction, horizontal direction, or diagonal direction.

Now, a swipe operation is an operation where the finger 220 is moved between two points on the screen in a state of being in contact or in proximity with the operating screen. An operating tool such as a touch pen may be used instead of a finger.

Also, the user can position fingers 220 on the image displayed in the second display region 222 on the display screen, and perform a pinch-in or pinch-out operation, thereby reducing or enlarging, of the region on the panorama image, the region displayed in the second display region.

Now, a pinch-in operation is an operation where the distance between a first finger and a second finger is reduced in a state of the first finger and the second finger being in contact or in proximity with the operating screen. A pinch-out operation is an operation where the distance between the first finger and the second finger is increased in a state of the first finger and the second finger being in contact or in proximity with the operating screen. Operating tools such as touch pens may be used instead of fingers.

The user performs operation to change the range of the image displayed in the display region 222 (first region), so that an image in a range corresponding to the range which the user wants to cause the imaging apparatus 110 to image, is displayed in the region indicated by the frame 223 (second region).

Now, the operating unit 126 of the terminal apparatus 120 is capable of accepting operations as to, of the first region (display region 222), a region not including the second region (region indicated by the frame 223). Accordingly, the user can change the range to be displayed in the range within the frame 223, even if operations a made regarding, of the display region 222, a region not including the region which the frame 223 indicates. The range displayed in the region within the frame 223 is a range corresponding to the imaging range which is to be imaged by the imaging apparatus 110.

The user can change the range displayed in the frame 223 and thus change the imaging range of the imaging apparatus 110, by performing operations as to the display region 222 which is a larger region than the region within the frame 223.

Thus, the user can easily specify a desired range in the range which the imaging apparatus 110 is capable of imaging. Note that the desired range here is a range corresponding to an imaging range which the user specifies as to the imaging apparatus 110.

Accordingly, the user can easily change the imaging range of the imaging apparatus 110 in comparison with a case where the imaging range of the imaging apparatus 110 is to be changed by changing the size and position of a frame on a panorama image displayed on the display screen.

The terminal apparatus 120 transmits an operation instruction to the imaging apparatus 110, to drive the imaging apparatus 110 such that the region of the subject corresponding to the image displayed within the frame 223 is the imaging range of the imaging apparatus 110.

A case where the range of the entire panorama image, and the range which the imaging apparatus 110 can image by changing the direction of imaging and the field of view, correspond, will be described in the present embodiment. The terminal apparatus 120 outputs instructions to change the imaging range of the imaging apparatus 110, such that the correlation between the entire panorama image and the range of the frame 223 correspond to the correlation between the range which the imaging apparatus 110 can image and the imaging range of the imaging apparatus 110.

That is to say, the relative position of the second region (region indicated by the frame 223) in the range which the imaging apparatus 110 can image by changing the imaging range corresponds to the relative position of the imaging range of the imaging apparatus 110 as to the range which the imaging apparatus 110 can image by changing the imaging range.

Also, the field of view of the imaging apparatus is changed, so that the size of the range displayed in the second region as to the range which the imaging apparatus 110 can image by changing the imaging range corresponds to the size of the imaging range of the imaging apparatus 110 as to the range which the imaging apparatus 110 can image by changing the imaging range.

A case of panning the imaging direction of the imaging apparatus 110 in the right direction by operating the terminal apparatus 120 in the present embodiment will be described with reference to FIG. 3. In a case where the user desires to pan the imaging direction of the imaging apparatus 110 in the right direction, the user performs a swipe operation from a position 320 to a position 321 in a state of a finger being in contact or in proximity with the display region 222. The position of the image displayed in the display region 222 is moved to the right on the displayed panorama image due to this swipe operation performed by the user.

The position 320 for the finger to come into contact with to pan the imaging direction may be a region other than the frame 223 within the display region 222. An arrangement may be made where, in a case where the finger touches within the frame 223, the panorama image displayed within the display region 222 is not moved but the position of the frame 223 is moved.

Figure 3:
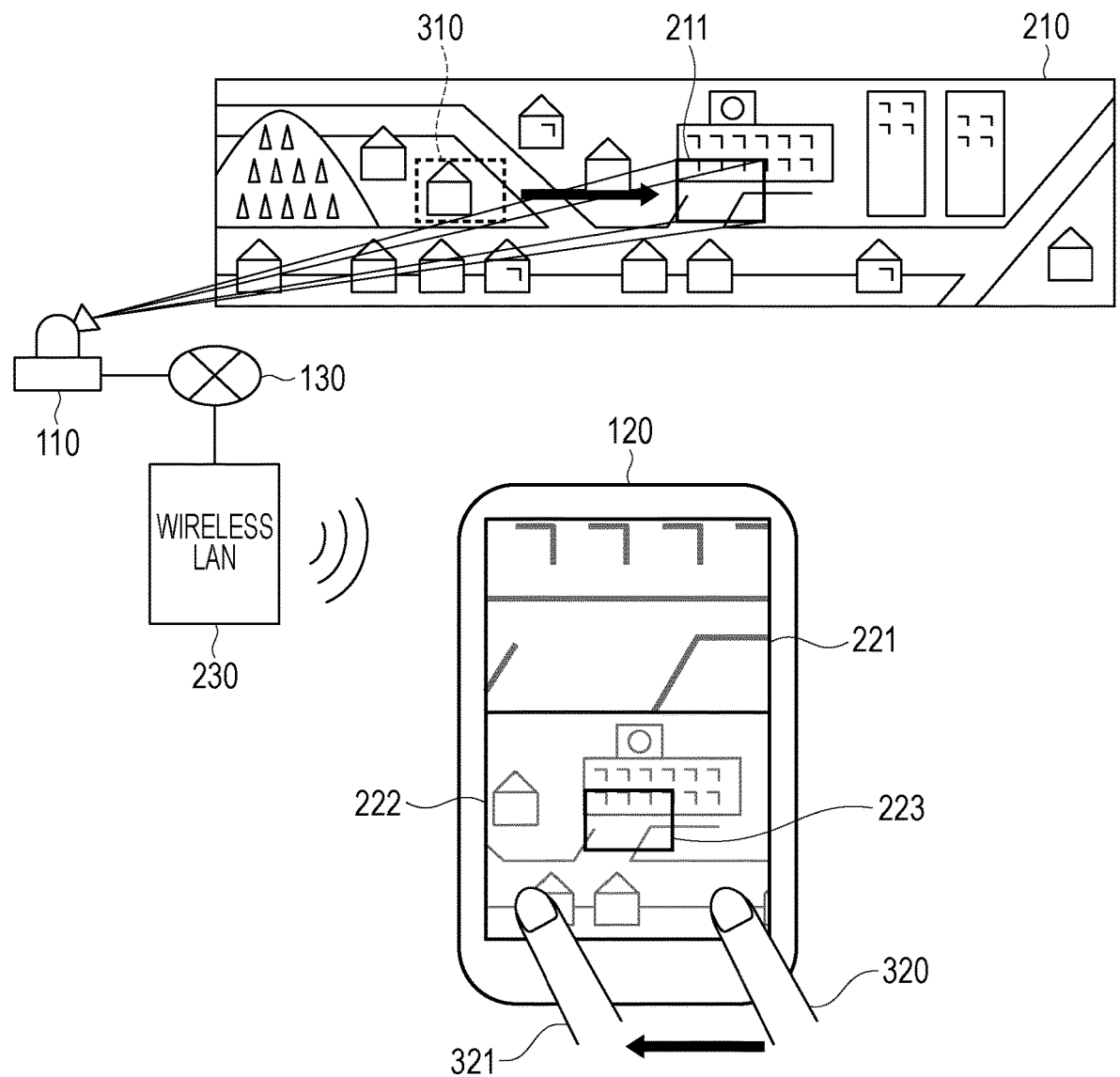
FIG. 3 is a diagram illustrating an operation example for changing the imaging range of the imaging apparatus 110 in the panning direction.

In the example illustrated in FIG. 3, the image displayed in the frame 223 is changed from a state where an image corresponding to the display region of the frame 310 is displayed, to a state where an image corresponding to the imaging range of the frame 211 is displayed, by this swipe operation.

Accordingly, the terminal apparatus 120 transmits to the imaging apparatus 110 an instruction to move the imaging range of the imaging apparatus 110 from the range indicated by the frame 310 in FIG. 3 to the range indicated by the frame 211. In a case where the frame 223 is moved, the imaging apparatus 110 is instructed so as to image the range indicated by the frame 223 after movement. Thus, the imaging apparatus 110 is controlled to pan in the right direction, so that the imaging range changes form the range indicated by the frame 310 to the range indicated by the frame 211.

Figure 4:
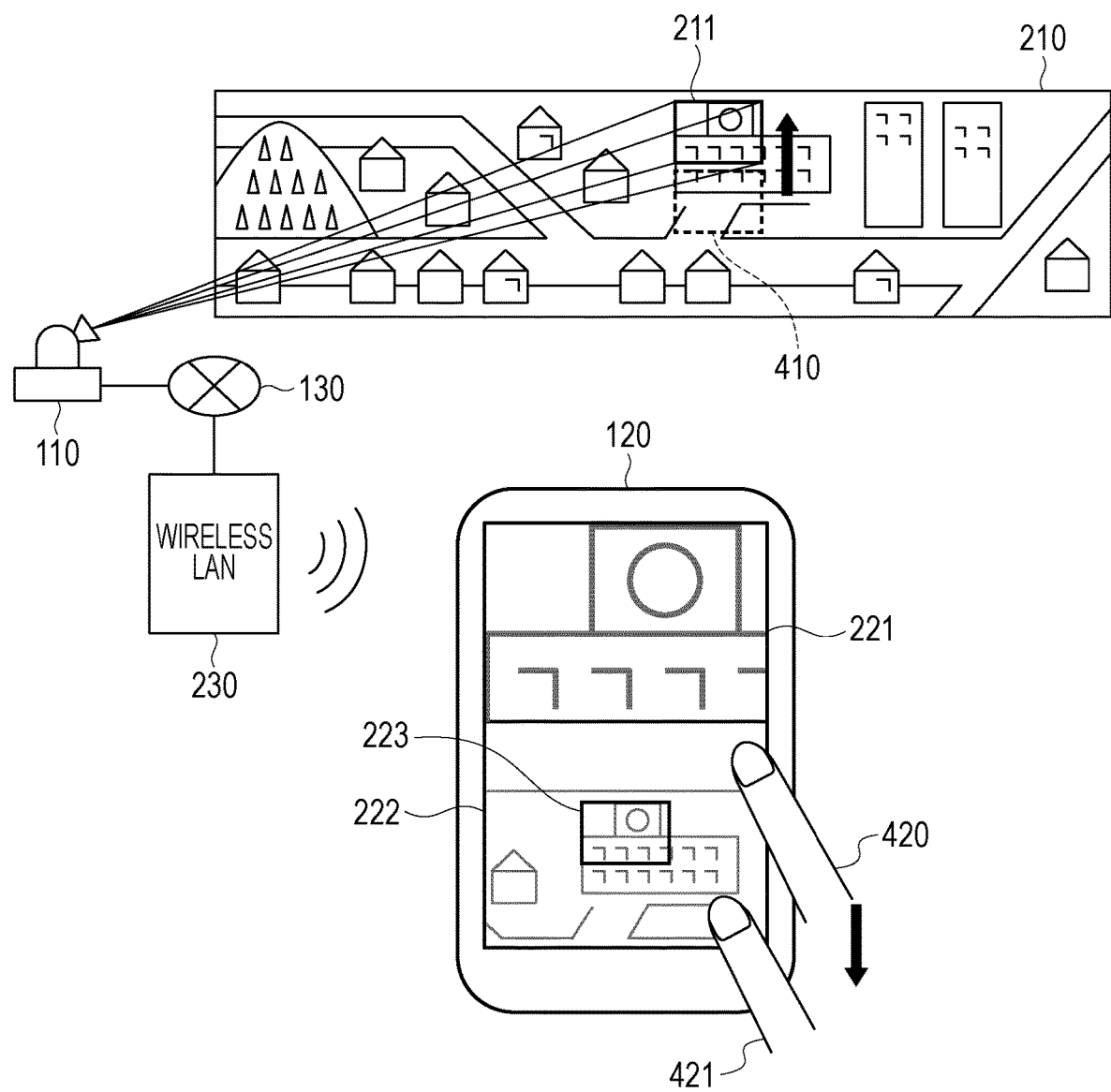
FIG. 4 is a diagram illustrating an operation example for changing the imaging range of the imaging apparatus in the tilting direction.

Next, a case of tilting the imaging direction of the imaging apparatus 110 in the vertical direction by operating the terminal apparatus 120 will be described with reference to FIG. 4. In a case where the user desires to tilt the imaging direction of the imaging apparatus 110 in the vertical direction, the user performs a swipe operation from a position 420 to a position 421 in a state of a finger being in contact or in proximity with the display region 222. The position of the image displayed in the display region 222 changes vertically on the displayed panorama image in the example illustrated in FIG. 4. The image displayed within the frame 223 thus changes, and tilt control of the imaging direction of the imaging apparatus 110 upwards is performed in the same way as with the case of the panning operation. According to the operation example described with reference to FIG. 4, the imaging direction of the imaging apparatus 110 is changed from a state of imaging an imaging range 410 to a state of imaging the imaging range of the frame 211. The imaging direction can be diagonally moved, in the same way.

Figure 5:
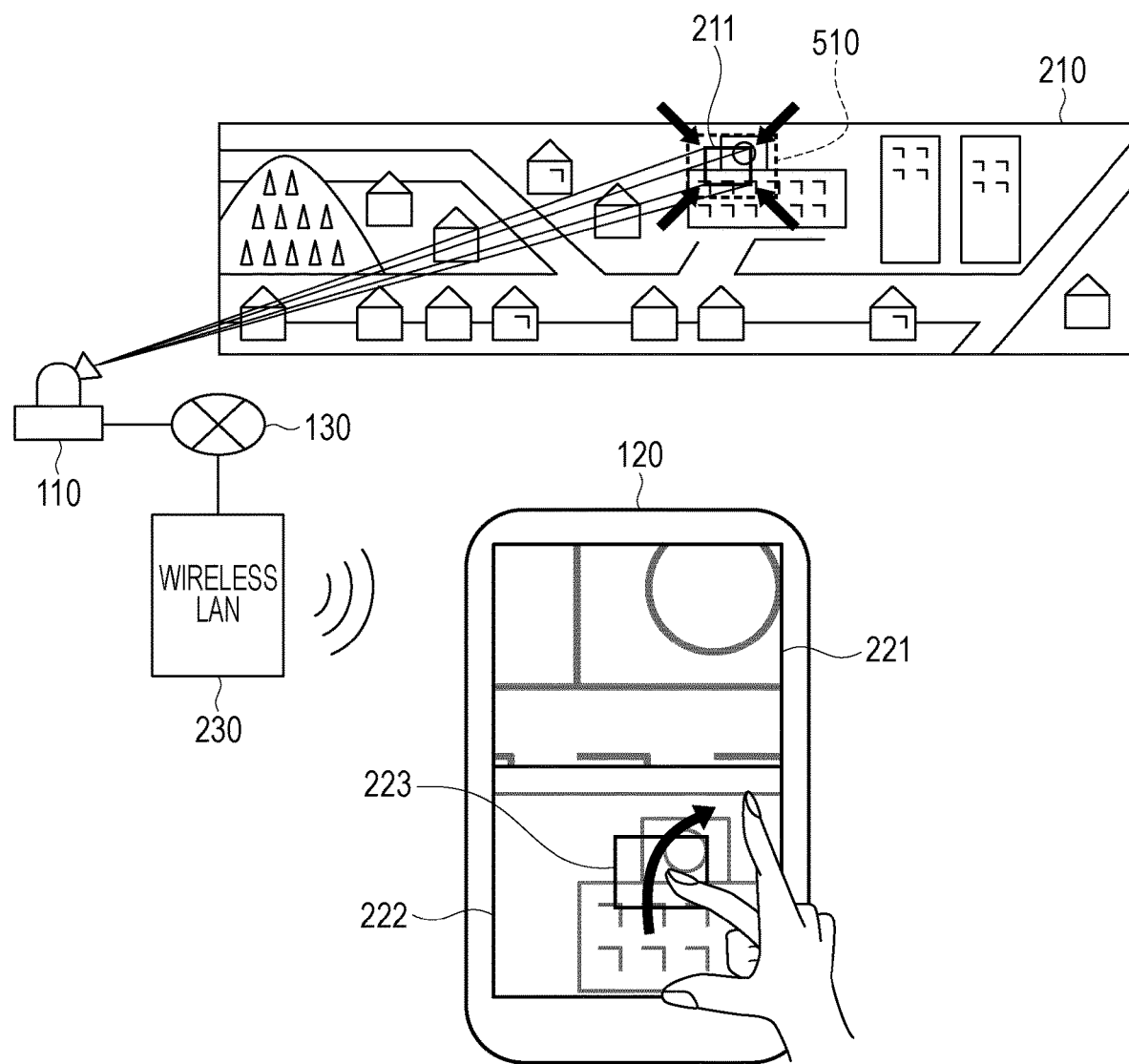
FIG. 5 is a diagram illustrating an operation example for changing the field of view of the imaging apparatus.

Next, an example of a case of performing zoom control as to the imaging apparatus 110 will be described with reference to FIG. 5. The image displayed in the frame 223 is enlarged by the user performing a pinch-out operation such that the panorama image displayed in the display region 222 is enlarged. Zoom control of the imaging range of the imaging apparatus 110 is performed to telephoto in accordance with the image displayed in the frame 223 being enlarged. In the operation example described with reference to FIG. 5, the field of view of the imaging apparatus 110 is reduced from the range indicated by the frame 510 illustrated in FIG. 5 to the range indicated by the frame 211.

The operation examples described with reference to FIGS. 2 through 5 are only examples and not restricted thusly. An operation to change the position of a range of an image displayed in the display region 222 in the panorama image is not restricted to a touch operation. For example, the user may operate a mouse connected to the terminal apparatus 120 to move a cursor displayed on the display screen, and move the image by dragging and dropping. Alternatively, a keyboard connected to the terminal apparatus 120 may be operated to change the image displayed in the display region 222.

Also, the display unit 125 may be arranged to display buttons for moving, enlarging, and reducing a region on the panorama image displayed in the display region 222, on the display screen, with the user operating the buttons. Alternatively, a slide bar may be displayed along with the image in the display region 222, so that moving, enlarging, and reducing of the region displayed in the display region 222 on the panorama image can be instructed by operating the slide bar.

Figure 6:
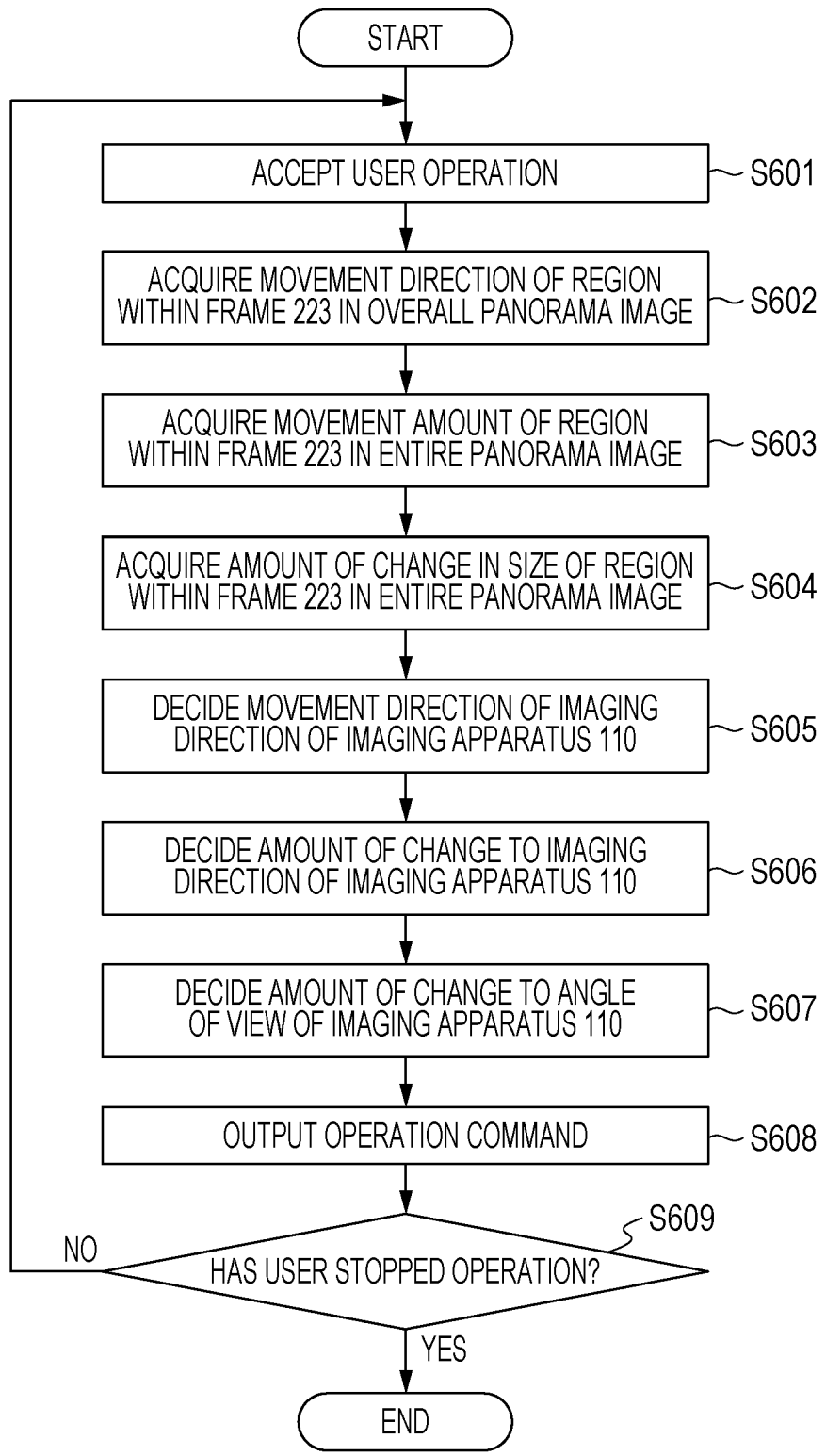
FIG. 6 is a diagram illustrating operations of a terminal apparatus according to a first embodiment.

Next, the operations of the terminal apparatus 120 will be described with reference to FIG. 6. In a form where the control unit 122 of the terminal apparatus 120 has a processor and memory built in, the procedures illustrated in FIG. 6 are realized by the control unit 122 loading a program stored in the storage unit 123 to the memory 104 and executing the program. Alternatively, part or all of the processing illustrated in FIG. 6 may be performed by hardware.

In step S601, the control unit 122 accepts user operations input to the operating unit 126. In a case where the user operations are performed by touch operations, the operations can be started by the user bringing a finger into contact or proximity with an image displayed on the display unit 125, for example. Or, the user may start operations by performing a drag operation of an image displayed on the display unit 125. Alternatively, in a case where user operations are to be performed by buttons or a scroll bar displayed on the display unit 125, user operations can be started by clicking on a button or starting to move a scroll bar. A drag operation is an operation where the mouse is moved so as to move the cursor over the display screen, with the mouse button pressed.

In step S602, the control unit 122 acquires the direction of movement in which the region within the frame 223 on the panorama image has moved due to the user operation. The region within the range 210 which corresponds to the display region 222 is changed by the user performing operations within the display region 222 (e.g., outside of the frame 223), as described above. The range 210 is a range capable of imaging, which the imaging apparatus 110 can image by changing the imaging range. The region within the range 210 corresponding to the frame 223 is also changed in accordance with this change. The imaging apparatus 110 is instructed to image the region within the range 210 that corresponds to the frame 223.

In step S603, the control unit 122 acquires the amount of movement of which the region within the frame 223 has moved on the panorama image by the user operations. The movement amount of the region within the frame 223 may be, for example, the distance over which the center of the region in the frame 223 has moved over the panorama image, for example.

In step S604, the control unit 122 acquires the amount of change in the size of the region within the frame 223 on the panorama image due to the user operations.

In step S605, the control unit 122 decides the direction into which the imaging direction of the imaging apparatus 110 is to be changed, based on the direction of movement acquired in step S602.

In step S606, the control unit 122 decides the amount of change by which to change the imaging direction of the imaging apparatus 110 from the current imaging direction, in accordance with the amount of movement acquired in step S603.

In step S607, the control unit 122 decides the amount of change to the field of view of the imaging apparatus 110 by changing the zooming factor in accordance with the amount of change acquired in step S604.

In step S608, the control unit 122 controls the communication unit 121 so as to output operation instructions to the imaging apparatus 110, for changing the imaging range of the imaging apparatus 110.

The operation instructions output to the imaging apparatus 110 include an instruction of the direction of movement in which to change the imaging direction of the imaging apparatus 110, in accordance with what has been decided in step S605. The operation instructions output to the imaging apparatus 110 also include an instruction of the amount of change in the imaging direction of the imaging apparatus 110, in accordance with what has been decided in step S606. The operation instructions transmitted to the imaging apparatus 110 further include an instruction of the amount of change of the field of view of the imaging apparatus 110, in accordance with what has been decided in step S607.

In step S609, the control unit 122 determines whether or not the user operations have stopped. In a case where user operations are performed by touch operations, stopping of user operations can be determined in a case where the finger of the user has been distanced from the display screen, for example. Also, in a case where user operations are performed by operating a cursor displayed on the display screen, stopping of user operations can be determined after an image displayed on the display unit 125 has been dragged and then dropped, for example. Further, in a case where user operations are performed by buttons or a scroll bar displayed on the display unit 125, stopping of user operations can be determined in a case where clicking of a button has been completed, or movement of the scroll bar has stopped, for example. Note that a drop operation as used here is an operation where, in a state that a drag operation is being performed, an operation to release the mouse button is performed.

In a case where determination is performed that operations are ongoing (No in S609), the control unit 122 repeats the operations of steps S601 through S608.

On the other hand, in a case where determination is performed that operations have stopped (Yes in S609), the control unit 122 ends the processing to control the imaging range of the imaging apparatus 110. Operation instructions may be transmitted to the imaging apparatus 110 after determination is made that the user has stopped operations, which will be described later. That is to say, the user may perform operations as to the display region 222, and after specifying of the imaging range after changing has ended, transmit operation instructions to the imaging apparatus 110.

Figure 8:
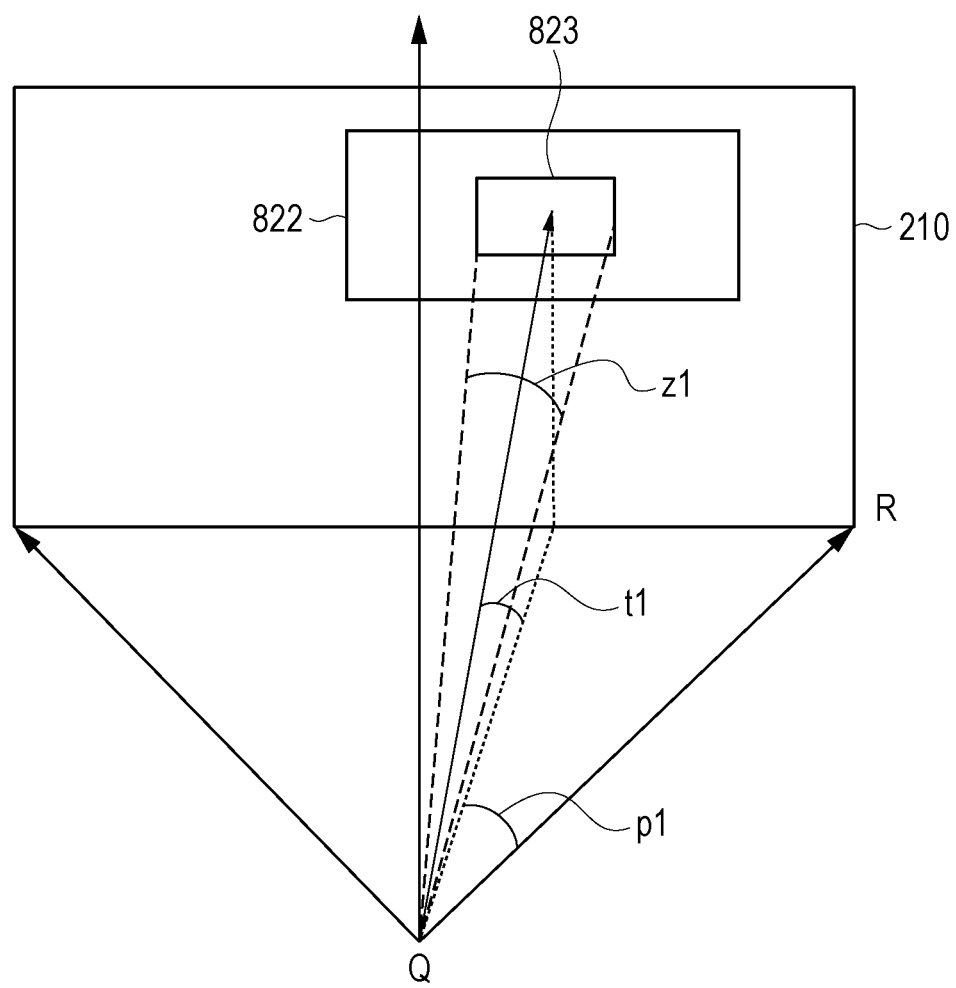
FIG. 8 is a diagram illustrating region display on the terminal apparatus, out of the range the imaging apparatus can image.

Next, the region displayed on the terminal apparatus 120 out of the range which the imaging apparatus 110 can image will be described with reference to FIG. 8. A point Q in FIG. 8 illustrates the position at which the imaging apparatus 110 has been set up. A range 210 in FIG. 8 illustrates the range which the imaging apparatus 110 can image by changing the imaging direction and field of view. The region which the entire panorama image indicates corresponds to the entire range 210 in the present embodiment.

A range 822 in FIG. 8 illustrates a region of a subject corresponding to an image displayed in the display region 222 on the terminal apparatus 120. Also, a range 823 in FIG. 8 illustrates a region of the subject corresponding to the image displayed in the frame 223 on the terminal apparatus 120. Also, a range 823 illustrates a region of the subject corresponding to the image displayed in the display region 222 on the terminal apparatus 120. Further, the range 823 illustrates the imaging range which the imaging apparatus 110 images in accordance with instructions from the terminal apparatus 120.

The range 823 is subjected to enlarging, reducing, and moving on the range 210, while maintaining a relative relationship with the range 822. The relative relationship between the range 822 and the range 823 includes the relatively positional relationship between the range 822 and the range 823. The relative relationship between the range 822 and the range 823 includes the relatively relationship regarding size (e.g., area) between the range 822 and the range 823.

The user can decide the position and size of the range 822 in the range 210 by deciding the range of the panorama image which is displayed on the display region 222 by operating the terminal apparatus 120.

The range of the range 822 in the range 210 changes by the user operating the terminal apparatus 120 to change the range of the panorama image displayed in the display region 222.

The position and size of the range 823 in the range 210 is changed while maintaining the relative relationship with the range 822, in accordance with change in the range of the range 822.

Thus, the user can change the position and size of the range 823 in the range 210, indicating the imaging range of the imaging apparatus 110, by changing the range of the panorama image displayed in the display region 222, by operating the terminal apparatus 120.

As described above, the terminal apparatus 120 can change the imaging range of the imaging apparatus 110 so that the range corresponding to the image displayed in the frame 223 is the imaging range of the imaging apparatus 110.

According to the present embodiment, the user can change the imaging range of the imaging apparatus 110 without changing the position and size of the frame 223 displayed in the display region 222.

The user can change the imaging range of the imaging apparatus 110 by performing operations as to the panorama image within the display region 222, displayed larger than the frame 223, in accordance with the imaging range.

Thus, according to the first embodiment, the user can easily specify a desired position on a panorama image. Accordingly, the user can easily change the imaging range of the imaging apparatus 110 using the terminal apparatus 120.

Second Embodiment

In the second embodiment, an example will be described where the imaging range of the imaging apparatus 110 is changed after the user stops user operations as to the terminal apparatus 120.

The deciding unit 124 of the terminal apparatus 120 according to the present embodiment decides the contents of the operation instructions to be transmitted to the imaging apparatus 110 in accordance with the amount of operations accepted by the operating unit 126. For example, the deciding unit 124 decides a control value for moving the imaging direction of the imaging apparatus 110 in the panning direction or tilting direction, in accordance with the amount of operations as to the operating unit 126. Alternatively, the deciding unit 124 decides a control value for enlarging or reducing the field of view of the imaging apparatus 110, in accordance with the amount of operations as to the operating unit 126.

The deciding unit 124 decides the amount of change for changing the imaging range of the imaging apparatus 110, in accordance with the distance of the position of the image displayed in the display region 222 on the image corresponding to the range which can be imaged by changing the imaging range of the imaging apparatus 110, which has been changed by operations as to the display screen.

The distance of the position of the image displayed in the display region 222 on the image corresponding to the range which can be imaged by changing the imaging range of the imaging apparatus 110 can be obtained based on the distance on the display screen where the image displayed in the display region 222 has been changed by operations as to the display screen.

Also, the deciding unit 124 decides the amount of change by which to change the imaging range of the imaging apparatus 110, in accordance with the rate at which the size of the image displayed in the display region 222 in the image corresponding to the range which can be imaged by changing the imaging range of the imaging apparatus 110, changed by operations as to the display screen.

The rate at which the size of the image displayed in the display region 222 in the image corresponding to the range which can be imaged by changing the imaging range of the imaging apparatus 110, can be obtained based on the scale factor of enlargement or reduction of the image displayed in the display region 222 by operations as to the display screen. Other configurations of the imaging apparatus 110 and the terminal apparatus 120 are the same as those described in the first embodiment, so description will be omitted.

Figure 7:
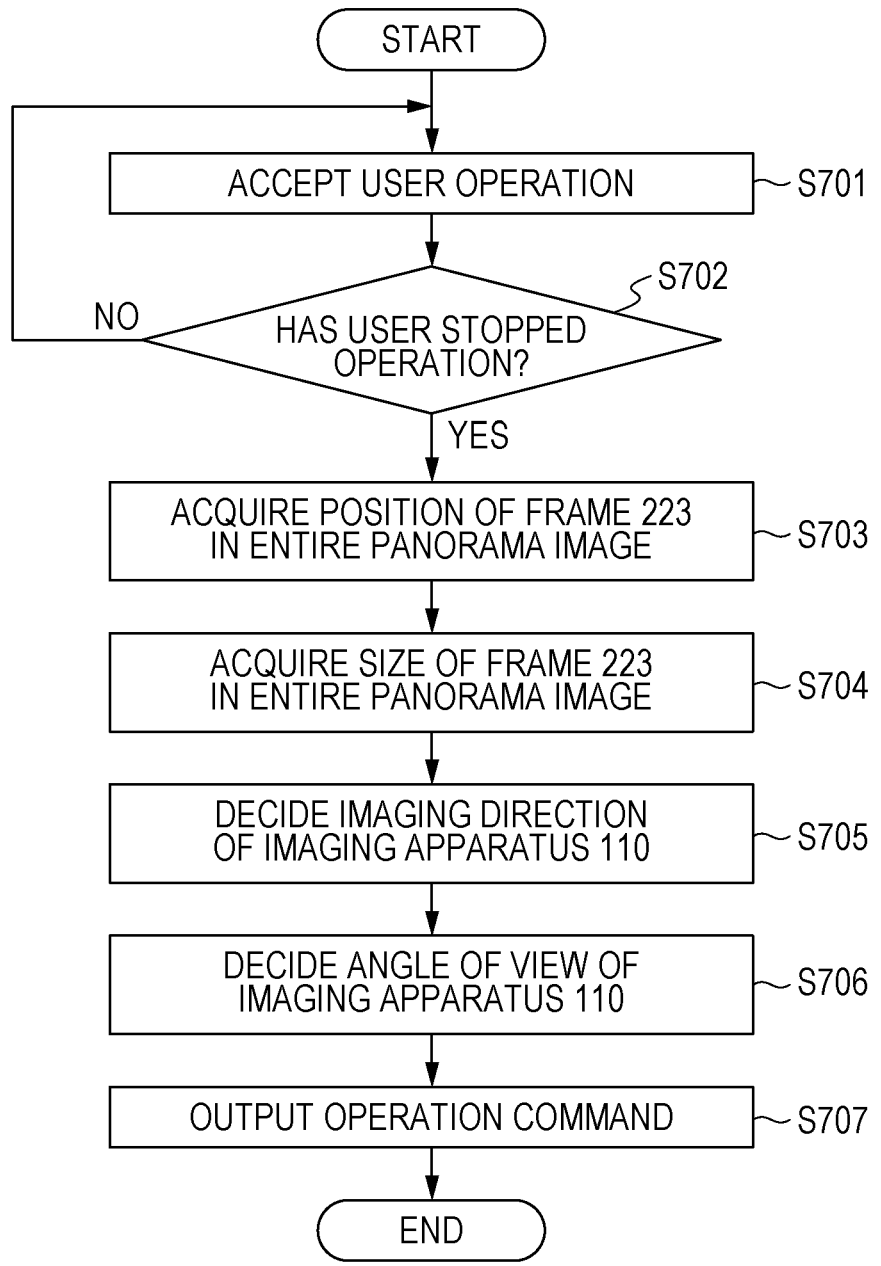
FIG. 7 is a diagram illustrating operations of a terminal apparatus according to a second embodiment.

The operations of the terminal apparatus 120 in the present embodiment will be described with reference to the flowchart in FIG. 7. In a form where the control unit 122 of the terminal apparatus 120 has a processor and memory built in, the procedures illustrated in FIG. 7 are realized by the control unit 122 loading a program stored in the storage unit 123 to the memory 104 and executing the program. Alternatively, part or all of the processing illustrated in FIG. 7 may be performed by hardware.

First, in step S701, the control unit 122 accepts user operations input to the operating unit 126. This accepting of user operations is the same as the processing in step S601 in FIG. 6 in the first embodiment.

In step S702, the control unit 122 determines whether or not the user operations have stopped. Determination of whether the user has stopped operations is the same as the processing of step S609 in FIG. 6 in the first embodiment. In a case where determination is made that user operations have not been stopped (No in step S702), the control unit 122 repeats the operations of steps S701 and S702. On the other hand, in a case where determination is performed that user operations have stopped (Yes in step S702), the control unit 122 advances the flow to step S703.

In step S703, the control unit 122 acquires the position of the frame 223 in the entire panorama image. For example, the coordinates indicating the position of the center of the frame 223 in the coordinates of which the center of the panorama image is the origin, are obtained. The origin is not restricted to the center of the panorama image, and may be the vertices of the panorama image, or may be any point. Also, this is not restricted to a case of acquiring the coordinates for the center of the frame 223, and the coordinates of the vertices or any point of the frame 223 may be acquired.

Next, in step S704, the control unit 122 acquires the size of the frame 223 in the entire panorama image. For example, coordinates indicating the position of each vertex of the frame 223, with the center of the panorama image as the origin, are obtained. In a case where the frame 223 is a rectangle, coordinates at both ends of one diagonal of the diagonals of the frame 223 may be acquired. The origin is not restricted to the center of the panorama image, and may be any vertex or any point of the panorama image. Also, this is not restricted to cases of the vertex coordinates of the frame 223, and the percentage of area of the image displayed in the frame 223 as to the entire area of the panorama image may be acquired.

The control unit 122 may execute the processing of step S703 and step S704 at the same time by acquiring the coordinates of the vertices of the frame 223 in a coordinates system set for the entire panorama image.

In step S705, the control unit 122 decides the imaging direction of the imaging apparatus 110 in accordance with what has been acquired in step S703. The control unit 122 decides the imaging direction of the imaging apparatus 110 so that the relative position of the imaging range of the imaging apparatus 110 as within the range which can be imaged by the imaging apparatus 110 corresponds to the relative position of the frame 223 in the entire panorama image.

In step S706, the control unit 122 decides the field of view of the imaging apparatus 110 in accordance with what has been acquired in step S704. The control unit 122 decides the field of view of the imaging apparatus 110 so that the relative size of the imaging range of the imaging apparatus 110 as within the range which can be imaged by the imaging apparatus 110 corresponds to the relative size of the frame 223 in the entire panorama image.

In step S707, the control unit 122 controls the communication unit 121 to output to the imaging apparatus 110 operation instructions to change the imaging range of the imaging apparatus 110.

The operation instructions output to the imaging apparatus 110 include instructions of the imaging direction of the imaging apparatus 110 in accordance with what has been decided in step S705. The operation instructions output to the imaging apparatus 110 also include instructions of the field of view of the imaging apparatus 110 in accordance with what has been decided in step S706.

Thus, the terminal apparatus 120 can change the imaging range of the imaging apparatus 110 so that the range corresponding to the image displayed in the frame 223 is the imaging range of the imaging apparatus 110.

Next, the deciding of the imaging direction of the imaging apparatus 110 in step S705 will be described with reference to FIG. 8. A pan angle p1 illustrated in FIG. 8 illustrates the pan angle of the current imaging direction as to the reference direction R for the imaging direction of the imaging apparatus 110. A tilt angle t1 illustrated in FIG. 8 illustrates the tilt angle of the current imaging direction as to the reference position for the imaging direction of the imaging apparatus 110. A field of view z1 illustrated in FIG. 8 illustrates the field of view of the imaging apparatus 110.

The width and height of the range 823 are set so as to maintain an aspect ratio, which is the ratio of the long sides and short sides of the imaging range of the imaging apparatus 110. The pan angle p1, tilt angle t1, and field of view z1, are decided from the positional relationship between the range 210 corresponding to the entire panorama image and the range 823.

For example, description will be made regarding a case where the center of the range 823 and the center of the range 822 match. In a coordinates system on the range 210 of which any point in the range 210 is the origin, the range 823 is set to the center of the range 822 beforehand, so if the coordinates of the center of the range 822 are (x, y), the control values of the pan angle p1 and tilt angle t1 are (x, y).

Also, in a case where the range 822 has been enlarged or reduced, the range 823 is enlarged or reduced in accordance to the range 822. Thus, the zoom z1 is decided.

According to the present embodiment, the user can change the imaging range of the imaging apparatus 110 without changing the position and size of the frame 223 displayed on the display region 222.

The user can change the imaging range of the imaging apparatus 110 by performing operations as to the panorama image within the display region 222 which is displayed larger than the frame 223 in accordance with the imaging range.

Thus, according to the second embodiment, the user can easily specify a desired position on a panorama image according to the present invention. Accordingly, the user can easily change the imaging range of the imaging apparatus 110 using the terminal apparatus 120.

Third Embodiment

In a case where a wide-angle image is displayed in the display region 222, moving the image displayed in the display region 222 changes the imaging direction of the imaging apparatus 110 more as compared to a case where an image with a small field of view is displayed in the display region 222. Accordingly, fine operations of the imaging direction of the imaging apparatus 110 may be less easy for the user in a case where a wide-angle image is displayed in the display region 222.

Accordingly, a case will be described in the third embodiment regarding changing the distance of moving the region displayed in the display region 222 over the panorama image, in accordance with the enlargement scale factor of the image displayed in the display region 222. The configurations of the imaging apparatus 110 and the terminal apparatus 120 are the same as described in the first embodiment, so description thereof will be omitted.

The control unit 122 of the terminal apparatus 120 according to the present embodiment changes the distance to move the region displayed in the display region 222 over the panorama image in accordance with the scale factor of enlargement of the image displayed in the display region 222, with regard to certain operations performed by the user.

For example, assumption will be made that the display scale factor of the panorama image displayed in the display region 222 is a first scale factor. Assumption will be made that at this time, the user performing a swipe operation in a state with a finger in contact with or in proximity with the screen over a first distance of movement causes the range displayed in the display region 222 to move over the panorama image by a second distance.

Assumption will also be made that the display scale factor of the panorama image displayed in the display region 222 is a second scale factor which is larger than the first scale factor. That is to say, the panorama image is displayed in the display region 222 in a manner enlarged as compared to a case of being displayed at the first scale factor.

Assumption will be made that at this time, the user performing a swipe operation in a state with a finger in contact with or in proximity with the screen over the first distance of movement causes the range displayed in the display region 222 to move over the panorama image by a third distance.

The control unit 122 of the terminal apparatus 120 controls the display unit 125 in the present embodiment so that the second distance is shorter than the third distance. Thus, the user can perform fine operations of the imaging direction of the imaging apparatus 110 even in cases where the display scale factor of the panorama image displayed in the display region 222 is small.

Conversely, the control unit 122 of the terminal apparatus 120 may control the display unit 125 so that the third distance is shorter than the second distance. According to this arrangement, the imaging direction of the imaging apparatus 110 can be changed with a small amount of operations, even in a case where the scale factor of the panorama image displayed in the display region 222 is large.

While preferred embodiments of the present invention have been described in the first through third embodiments, the present invention is not restricted to these embodiments, and various changes may be made without departing from the scope of the essence thereof.

While description has been made in the above first through third embodiments regarding an example of using a panorama image generated based on an imaged image imaged by the imaging apparatus 110, this is not restrictive. It is sufficient to be an image representing the range over which the imaging apparatus 110 can image. For example, a map illustrating the positions of objects present in the range where the imaging apparatus can image, may be used instead of the panorama image.

The user can operate the terminal apparatus 120 so that a desired region in the map is displayed within the frame 223, thereby controlling the imaging apparatus 110 so as to image an imaging range corresponding to the region of the map included in the frame 223.

Also, while description has been made in the above first through third embodiments regarding an example where the entire panorama image which can be displayed in the display region 222 corresponds to the entire range where the imaging apparatus 110 can image, this is not restrictive.

For example, in a case where, of the range which the imaging apparatus 110 can image by changing the imaging range, the range which the terminal apparatus 120 can view is restricted, the range of the image which is displayed on the display region 222 of the terminal apparatus 120 may be restricted. That is to say, the range of the image which can be displayed on the display region 222 may be restricted to the range which the terminal apparatus 120 can view.

Also, the frame 223 does not necessarily have to be displayed. It is sufficient for an imaging range corresponding to the image displayed in a predetermined region of the display region 222 to be set beforehand so that the imaging apparatus 110 imaging this imaging range.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-261495, filed Dec. 18, 2013, which is hereby incorporated by reference herein in its entirety.

What is claimed is:

1. A control apparatus comprising:
a display control unit configured to control a display unit to
display a display screen having a first region and a second region which is part of the first region,
display, in the first region, at least a first partial image of a predetermined image, the predetermined image indicating a region where an external imaging apparatus can capture by changing an imaging region which is captured by the external imaging apparatus, and the predetermined image being based on an image captured by the external imaging apparatus, and
display, in the second region, a second partial image of the predetermined image, the second partial image being a part of the first partial image;
a change control unit configured to change a position of the first partial image in the predetermined image to be displayed in the first region of the display screen by the display control unit, in accordance with a predetermined operation; and
an output unit configured to output an instruction to cause the external imaging apparatus to capture a region corresponding to the second partial image displayed in the second region after the change control unit has changed the position of the first partial image in the predetermined image to be displayed in the first region,
wherein a relative position of the first region is fixed with respect to the display screen and does not move while the change control unit is changing the position of the first partial image in the predetermined image to be displayed in the first region, and
wherein a relative position of the second region is fixed with respect to the display screen and does not move while the change control unit is changing the position of the first partial image in the predetermined image to be displayed in the first region.

2. The control apparatus according to claim 1, wherein the predetermined image is a panorama image generated by compositing a plurality of captured images which the external imaging apparatus has captured by changing the imaging region.

3. The control apparatus according to claim 1, wherein the output unit outputs an instruction to change the imaging region of the external imaging apparatus, such that a relative position of the second partial image in the predetermined image corresponds to the relative position of the current imaging region of the external imaging apparatus in the region where the external imaging apparatus can capture by changing the imaging region.

4. The control apparatus according to claim 1, wherein the output unit outputs an instruction to change the imaging region of the external imaging apparatus, such that a size of the second partial region as to the predetermined image, corresponds to the size of the changed imaging region of the external imaging apparatus as to the region where the external imaging apparatus can capture by changing the imaging region.

5. The control apparatus according to claim 1, further comprising:
a deciding unit configured to decide an amount of change by which to change the imaging region of the external imaging apparatus, in accordance with a distance on the display screen by which the first partial image displayed in the first region has been changed by operations as to the display screen, or in accordance with a scale factor by which the first partial image displayed in the first region has been enlarged or reduced by operations as to the display screen,
wherein the output unit outputs an instruction to change the imaging region of the external imaging apparatus in accordance with results decided by the deciding unit.

6. The control apparatus according to claim 1, wherein the second region is a region including a middle of the first region.

7. The control apparatus according to claim 1, further comprising:
an accepting unit configured to accept operations as to the display screen,
wherein the accepting unit can accept an operation as to a region of the first region not including the second region, and
wherein the changing control unit changes the position of the first partial image in the predetermined image to be displayed in the first region, based on the operation accepted by the accepting unit.

8. An imaging system comprising:
an imaging unit;
a display control unit configured to control a display unit to
display a screen having a first region and a second region which is part of the first region,
display, in the first refion, at least a first partial image of a predetermined image, the predetermined image indicating a region where an external imaging unit can capture by changing an imaging region which is captured by the external imaging unit, and the predetermined image being based on an image captured by the external imaging unit, and
display, in the second region, a second partial image of the predetermined image, the second partial image being a part of the first partial image;
a change control unit configured to change a position of the first partial image in the predetermined image to be displayed in the first region of the display screen by the display control unit, in accordance with a predetermined operation; and
an output unit configured to output an instruction to cause the external imaging unit to capture a region corresponding to the second partial image displayed in the second region, after the change control unit has changed the position of the first partial image in the predetermined image to be displayed in the first region, wherein a relative position of the first region is fixed with respect to the display screen and does not move while the change control unit is changing the position of the first partial image in the predetermined image to be displayed in the first region, and wherein a relative position of the second region is fixed with respect to the display screen and does not move while the change control unit is changing the position of the first partial image in the predetermined image to be displayed in the first region.

9. The imaging system according to claim 8, wherein the output unit outputs an instruction to change the imaging region of the external imaging unit, such that a relative position of the second partial image in the predetermined image corresponds to the relative position of the current imaging region of the external imaging unit in the region where the external imaging unit can capture by changing the imaging region.

10. The imaging system according to claim 8, wherein the output unit outputs an instruction to change the imaging region of the external imaging unit, such that a size of the second partial region as to the predetermined image corresponds to the size of the changed imaging region of the external imaging unit as to the region where the external imaging unit can capture by changing the imaging region.

11. A control method of an imaging apparatus comprising:
controlling a display unit to
display a display screen having a first region and a seond region which is part of the first region,
display, in the first region, at least a first partial image of a predetermined image, the predetermined image indicating a region where an external imaging apparatus can capture by changing an imaging region which is captured by the external imaging apparatus, and the predetermined image being based on an image captured by the external imaging apparatus, and
display, in the second revion, a second partial image of the predetetermined image, the second partial image being a part of the first partial image;
changing a position of the first partial image in the predetermined image to be displayed in the first region on the display screen by the display control unit, in accordance with a predetermined operation; and
outputting an instruction to cause the external imaging apparatus to capture a region corresponding to the second partial image displayed in the second region, after changing the position of the first partial image in the predetermined image to be displayed in the first region,
wherein a relative position of the first region is fixed with respect to the display screen does not move while changing the position of the first partial image in the predetermined image to be displayed in the first region, and wherein a relative position of the second region is fixed with respect to the display screen does not move while changing the position of the first partial image in the predetermined image to be displayed in the first region.

12. A non-transitory computer-readable medium storing a program to execute a control method of an imaging apparatus, the method comprising:
controlling a display unit to
display a display screen having a first region and a seond region which is part of the first region,
display, in the first region, at least a first partial image of a predetermined image, the predetermined image indicating a region where an external imaging apparatus can capture by changing an imaging region which is captured by the external imaging apparatus, and the predetermined image being based on an image captured by the external imaging apparatus, and
display, in the second revion, a second partial image of the predetetermined image, the second partial image being a part of the first partial image;
changing a position of the first partial image in the predetermined image to be displayed in the first region on the display screen by the display control unit, in accordance with a predetermined operation; and
outputting an instruction to cause the external imaging apparatus to capture a region corresponding to the second partial image displayed in the second region, after changing the position of the first partial image in the predetermined image to be displayed in the first region,
wherein a relative position of the first region is fixed with respect to the display screen does not move while changing the position of the first partial image in the predetermined image to be displayed in the first region, and
wherein a relative position of the second region is fixed with respect to the display screen does not move while changing the position of the first partial image in the predetermined image to be displayed in the first region.

13. The control method according to claim 12, wherein outputting to change the imaging direction of the external imaging apparatus, such that a relative position of the image displayed in the second region in the image indicating the region where the external imaging apparatus can capture by changing the imaging region corresponds to the relative position of the imaging region of the external imaging apparatus in the region where the external imaging apparatus can capture by changing the imaging region.

14. The control method according to claim 12, wherein outputting to change the field of view of the external imaging apparatus, such that a size of a region displayed in the second region as to the region where the external imaging apparatus can capture by changing the imaging region, corresponds to the size of the imaging region of the external imaging apparatus as to the region where the external imaging apparatus can capture by changing the imaging region.

* * * * *